United States Patent
Choi et al.

(10) Patent No.: US 12,523,654 B1
(45) Date of Patent: Jan. 13, 2026

(54) MULTIPLANAR PLANAR ELECTROMAGNETIC ARRAY

(71) Applicant: National Technology & Engineering Solutions of Sandia, LLC, Albuquerque, NM (US)

(72) Inventors: Gihoon Choi, Livermore, CA (US); Robert Meagher, Tracy, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 768 days.

(21) Appl. No.: 17/892,388

(22) Filed: Aug. 22, 2022

(51) Int. Cl.
| | |
|---|---|
| *H01F 7/02* | (2006.01) |
| *B01L 3/00* | (2006.01) |
| *G01N 33/543* | (2006.01) |
| *H01F 7/20* | (2006.01) |
| *H01F 41/04* | (2006.01) |

(52) U.S. Cl.
CPC .. *G01N 33/54386* (2013.01); *B01L 3/502761* (2013.01); *G01N 33/54326* (2013.01); *H01F 7/0205* (2013.01); *H01F 7/20* (2013.01); *H01F 41/04* (2013.01); *B01L 2200/0647* (2013.01); *B01L 2300/0645* (2013.01); *B01L 2300/0654* (2013.01); *B01L 2300/0819* (2013.01)

(58) Field of Classification Search
None
See application file for complete search history.

(56) References Cited

U.S. PATENT DOCUMENTS

| | | | |
|---|---|---|---|
| 2013/0285463 A1* | 10/2013 | Covic | H01F 27/2823 336/84 R |
| 2020/0044482 A1* | 2/2020 | Partovi | H02J 50/12 |
| 2021/0060555 A1* | 3/2021 | Yao | B01L 3/502715 |

OTHER PUBLICATIONS

Moehling, et al., "LAMP Diagnostics at the Point-of-Care: Emerging Trends and Perspectives for the Developer Community", Expert Review of Molecular Diagnostics, vol. 21, No. 1, pp. 43-61 (2021).
Rusling, et al., "Measurement of Biomarker Proteins for Point-of-Care Early Detection and Monitoring of Cancer", Analyst 135, pp. 2496-2511 (2010).
Zhang, et al., "Predicting Detection Limits of Enzyme-Linked Immunosorbent Array (ELISA) and Bioanalytical Techniques in General", Analyst 139, pp. 439-445 (2014).
Shi, et al., "Application of Microfluidics in Immunoassay: Recent Advancements", Journal of Healthcare Engineering, vol. 2021, Article ID 2959843, pp. 1-24 (Jul. 16, 2021).

(Continued)

*Primary Examiner* — Rebecca M Giere
(74) *Attorney, Agent, or Firm* — Calfee, Halter & Griswold, LLP; Samantha Updegraff (57) ABSTRACT

A multiplanar electromagnetic array is disclosed herein, where the array includes a first electromagnetic coil in a first plane, a second electromagnetic coil in a second plane, and a third electromagnetic coil in a third plane. A microactuator is configured to energize electromagnetic coils in the array in sequence, thereby forming a moving electromagnetic field that moves a permanent magnet positioned above the multiplanar electromagnetic array. Movement of the permanent magnet effectuates desired movement of a bead that is in a channel of an immunoassay device.

20 Claims, 8 Drawing Sheets

(56) References Cited

OTHER PUBLICATIONS

Metzler, et al., "Breaking the Interface: Efficient Extraction of Magnetic Beads from Nanoliter Droplets for Automated Sequential Immunoassays", Analytical Chemistry, vol. 92, pp. 10283-10290 (2020).
Koh, et al., "Centrifugal Microfluidic Platform for Ultrasensitive Detection of Botulinum Toxin", Analytical Chemistry, vol. 87, pp. 922-928 (2015).
Coudron, et al., "Fully Integrated Digital Microfluidics Platform for Automated Immunoassay; a Versatile Tool for Rapid, Specific Detection of a Wide Range of Pathogens", Biosensor and Bilelectronics 128, pp. 1-21 (2019).
Chiou, et al., "Topography-Assisted Electromagnetic Platform for Blood-to-PCR in a Droplet", Biosensors and Bioelectronics, vol. 50, pp. 91-99 (2013).
Beyzavi, et al., "Modeling and Optimization of Planar Microcoils", Journal of Micromechanics and Microengineering, vol. 18, pp. 1-8 (2008).
Long, et al., "Fundamentals of Magnet-Actuated Droplet Manipulation on an Open Hydrophobic Surface", Lab Chip 9, pp. 1567-1575 (Jun. 7, 2009).

* cited by examiner

MULTIPLANAR PLANAR ELECTROMAGNETIC ARRAY

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

TECHNICAL FIELD

The aspects described herein relate generally to the transportation of a permanent magnet on a planar electromagnetic microactuator array in immunoassay devices.

BACKGROUND

Identifying specific protein biomarkers is important for timely and cost-effective diagnosis. Therefore, the development of mobile and relatively low-cost technology for sensitive protein detection is of interest in the clinical setting. Qualitative lateral flow strips are commonly used for rapid, portable immunoassay tests. However, their sensitivity highly depends on the type of sample matrix. The qualitative readout of lateral flow strips is inadequate for some conditions that require quantitative analysis for a correct decision. On the contrary, the enzyme-linked immunosorbent assay (ELISA) is a gold standard technique for quantitative detection of proteins, allowing a detection limit in some cases down to femtomolar concentration. Complicated sample handling steps, long turnaround time, and bulky benchtop scanners, however, limit use of such assay at clinical sites. Alternatively, a microfluidic approach is well-suited for on-site clinical diagnosis because of its inherent attributes of portability, low sample/reagent volumes, and automated processing. To this end, extensive research efforts have been made to translate laboratory-quality immunoassays into a microfluidic format over the past decade.

Microfluidic immunoassays frequently involve using solid-phase particles, so-called bead-based ELISA, because a high surface-to-volume ratio promotes antigen-antibody binding. Use of beads significantly reduces the assay time while improving sensitivity, making bead-based assays well-suited for sequential immunoassay procedures (i.e., streamlined incubation, purification, and reaction). However, a consideration when implementing bead-based immunoassays in microfluidics relates to actuation of beads and liquid droplets in a controllable manner. Centrifugal microfluidic platforms can drive the beads for the streamlined immunoassay process without peripheral devices. However, centrifugal force can only direct the beads in one direction. Therefore, a sample sequence that requires multi-directional bead operation (e.g., agitation) in a clinical setting has thus far been limited.

Magnetic beads have been used in biological assays for purification, separation, and enrichment of specific target molecules (e.g., DNA, RNA, protein, and cell). Magnetic beads have historically been used as a solid-phase platform for manipulations in biology to retain specific target molecules during solution exchanges in multi-step biological assays. In small scale implementations, the multi-step biological assays, including immunoassays, may occur in a test tube, wherein the magnetic beads may be physically manipulated by holding a permanent magnet next to the test tube. In higher throughput laboratories, the manipulation of the magnetic beads is often an automated process, employing use of robotic arms to manipulate magnetic beads and exchange solutions within a multi-step biological assay. The use of automated processes for manipulating the magnetic beads with a robotic platform, however, is not feasible for small-scale multi-step biological assays, such as in a clinical setting.

Planar printed circuit board (PCB) electromagnetic coil arrays have been observed to control permanent neodymium magnet, a so-called microrobot system, in robotics. Spiral electromagnetic coils generate the highest magnetic field strength at the center of the coil, i.e., the innermost turn of the coil, when current flows through the coil. When magnetic interaction between an electromagnetic coil and the permanent magnet is higher than friction, the permanent magnet moves to the adjacent coil within the array. This often requires relatively high-power consumption for long-range transport of the permanent magnet due to the inverse square relationship of the field strength and distance (i.e., coil-permanent magnet). The weak electromagnetic field generated from PCB electromagnetic coils is insufficient to directly actuate magnetic beads without topographical assistance (i.e., the beads can only be moved when there is specific fluidic channel geometry) or high-power consumption for long-range transport.

SUMMARY

The following is a brief summary of subject matter that is described in greater detail herein. This summary is not intended to be limiting as to the scope of the claims.

A method to perform transport and manipulation of a permanent magnet using a multiplanar planar electromagnetic microactuator array, herein referred to as a multiplanar electromagnetic array, for actuating magnetic beads is described herein, wherein the multiplanar electromagnetic array comprises a first-layer, second-layer, and third-layer electromagnetic coil, where such coils partially overlap with one another. An amount of overlap between electromagnetic coils in different layers can be between 20% and 40%, such that, for example, 20%-40% of the first-layer electromagnetic coil overlaps with 20%-40% of the second-layer electromagnetic coil. The partially overlapped multiplanar PCB coil structure significantly reduces the power requirement for transport of a permanent magnet, and thus transport of a magnetic bead. Magnetic interaction between the permanent magnet and magnetic beads allows for bead actuation within an immunoassay device. To actuate the permanent magnet, a spatiotemporal magnetic field is generated from one overlapping electromagnetic coil at a time by controlling a transistor switch using a microcontroller, or microactuator. The permanent magnet is capable of navigating a plane in the X-, Y-, and diagonal directions by programmed control sequence of the multiplanar electromagnetic array.

The multiplanar electromagnetic array described herein comprises a first-layer electromagnetic coil, a second-layer electromagnetic coil (wherein the second-layer electromagnetic coil is partially overlapping the first-layer electromagnetic coil in the diagonal direction), and a third-layer electromagnetic coil (wherein the third-layer electromagnetic coil is partially overlapping the second-layer electromagnetic coil in the y-direction and is partially overlapping the first-layer magnetic coil in the x-direction). In some implementations thereof, electromagnetic coils are planar PCB electromagnetic coils. The multiplanar electromagnetic array further comprises a permanent magnet and a programmable microactuator. In some implementations thereof, the permanent magnet comprises neodymium. The programmable microactuator generates a spatiotemporal magnetic field by sequentially energizing at least two of the first-layer electromagnetic coil, second layer electromagnetic coil, or third-layer electromagnetic coil, wherein the spatiotemporal magnetic field is capable of actuating the permanent magnet in X-, Y-, and diagonal directions on a plane.

In some implementations thereof, the multiplanar electromagnetic array comprises a plurality of first-layer electromagnetic coils, a plurality of second-layer electromagnetic coils, and a plurality of a third-layer electromagnetic coils, wherein each of the second-layer electromagnetic coils partially overlap at least one of the first-layer electromagnetic coils, and each of the third-layer electromagnetic coils at least partially overlap at least one of the second-layer electromagnetic coils. Further, the first-layer electromagnetic coils are in a first plane, the second-layer electromagnetic coils are in a second plane, and the third-layer electromagnetic coils are in a third plane. In some implementations, each of the electromagnetic coils can be a substantially similar size and shape. For instance, the electromagnetic coils may have a width of about 7 mm and a height of about 7 mm. In some implementations, each of the plurality of first-layer, second-layer, and third-layer electromagnetic coils has a center point, wherein a distance between the center point of one of the plurality of first-layer electromagnetic coils and the center point of one of the plurality of second-layer electromagnetic coils overlapping the first-layer electromagnetic coil in the X-direction is about 4.5 mm. Further, the distance between the center point of one of the plurality of second-layer electromagnetic coils and the center point of one of the plurality of third-layer electromagnetic coils overlapping the second-layer electromagnetic coil in the Y-direction is about 4.5 mm. In some implementations, the distance between the center point of one of the plurality of first-layer electromagnetic coils and the center point of one of the plurality of third-layer electromagnetic coils overlapping the first-layer electromagnetic coil in the diagonal-direction is about 6.3 mm. In some implementations, each of the plurality of first-layer, second-layer, and third-layer electromagnetic coils comprise a copper trace with a width of about 170 um, a thickness of about 36 um, and a pitch distance of about 340 um. In some implementations, the multiplanar electromagnetic array comprises a total of 5-30 first-layer, second-layer, and third-layer electromagnetic coils. In a specific example, the multiplanar electromagnetic array comprises 25 first-layer, second-layer, and third-layer electromagnetic coils. While the electromagnetic coils of different layers have been described as being aligned in the X and Y directions, it is to be understood that in some embodiments the electromagnetic coils can be offset in one or both of the X and Y direction from one another.

A method of transporting a permanent magnet on an electromagnetic microactuator array is also described herein. The method comprises providing a first-layer electromagnetic coil and a second-layer electromagnetic coil, wherein the second-layer electromagnetic coil is partially overlapping the first-layer electromagnetic coil in the diagonal direction. The method also includes providing a third-layer electromagnetic coil, wherein the third-layer electromagnetic coil is partially overlapping the second-layer electromagnetic coil in the y-direction, and wherein the third-layer electromagnetic coil is partially overlapping the first-layer magnetic coil in the x-direction. The method further comprises providing a programmable microactuator and providing a permanent magnet. The programmable microactuator generates a spatiotemporal magnetic field by sequentially energizing at least two of the first-layer electromagnetic coil, second layer electromagnetic coil, or third-layer electromagnetic coil, thereby actuating the permanent magnet in X-, Y-, and/or diagonal directions on a plane.

A microfluidic immunoassay device is also described herein. The microfluidic immunoassay device comprises a mobile analyzer. The mobile analyzer includes a multiplanar electromagnetic array and a microfluidic chip. The multiplanar electromagnetic array comprises a first-layer electromagnetic coil and a second-layer electromagnetic coil, wherein the second-layer electromagnetic coil is partially overlapping the first-layer electromagnetic coil in a diagonal direction. The array also includes a third-layer electromagnetic coil, where the third-layer electromagnetic coil is partially overlapping the second-layer electromagnetic coil in the y-direction, and wherein the third-layer electromagnetic coil is partially overlapping the first-layer magnetic coil in the x-direction. The microfluidic chip comprises a channel and a magnetic bead. The programmable microactuator is capable of generating a spatiotemporal magnetic field by sequentially energizing at least two of the first-layer electromagnetic coil, second layer electromagnetic coil, and third-layer electromagnetic coil. The spatiotemporal magnetic field is capable of actuating the permanent magnet in X-, Y-, and diagonal directions on a plane. The permanent magnet is capable of manipulating the magnetic bead within the at least one channel of the microfluidic chip.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to performing transport and manipulation of a permanent magnet using a multiplanar planar electromagnetic microactuator array are described herein, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As described herein, when one or more components are described as being connected, joined, affixed, coupled, attached, or otherwise interconnected, such interconnection may be direct as between the components or may be indirect such as through the use of one or more intermediary components. Also as described herein, reference to a "member," "component," or "portion" shall not be limited to a single structural member, component, or element but can include an assembly of components, members, or elements. Also as described herein, the terms "substantially" and "about" are defined as at least close to (and includes) a given value or state (preferably within 10% of, more preferably within 1% of, and most preferably within 0.1% of).

Electromagnets do not provide a strong enough magnetic force to move a permanent magnet without applying a relatively high current, because magnetic force dramatically decreases as distance from the center of the coil increases. Overlapping the coils reduces the distance between the centers of the adjacently overlapped coils, which allows for the generation of enough electromagnetic force to move a magnet without incurring a large amount of power consumption. As disclosed herein, an array of overlapping layers of electromagnetic coils allows for the manipulation of a permanent magnet in the x-, y-, and diagonal directions. In turn, the permanent magnet can generate a magnetic force strong enough to move magnetic beads within a microfluidic immunoassay device. The microfluidic immunoassay device comprises a microfluidic chip that includes a series of test units, or channels. Each channel may further comprise a series of chambers. The electromagnetic coils can be used to transport the magnetic beads from one chamber to the next within the microfluidic chip, or to agitate the magnetic bead within a single chamber.

Figure 1:
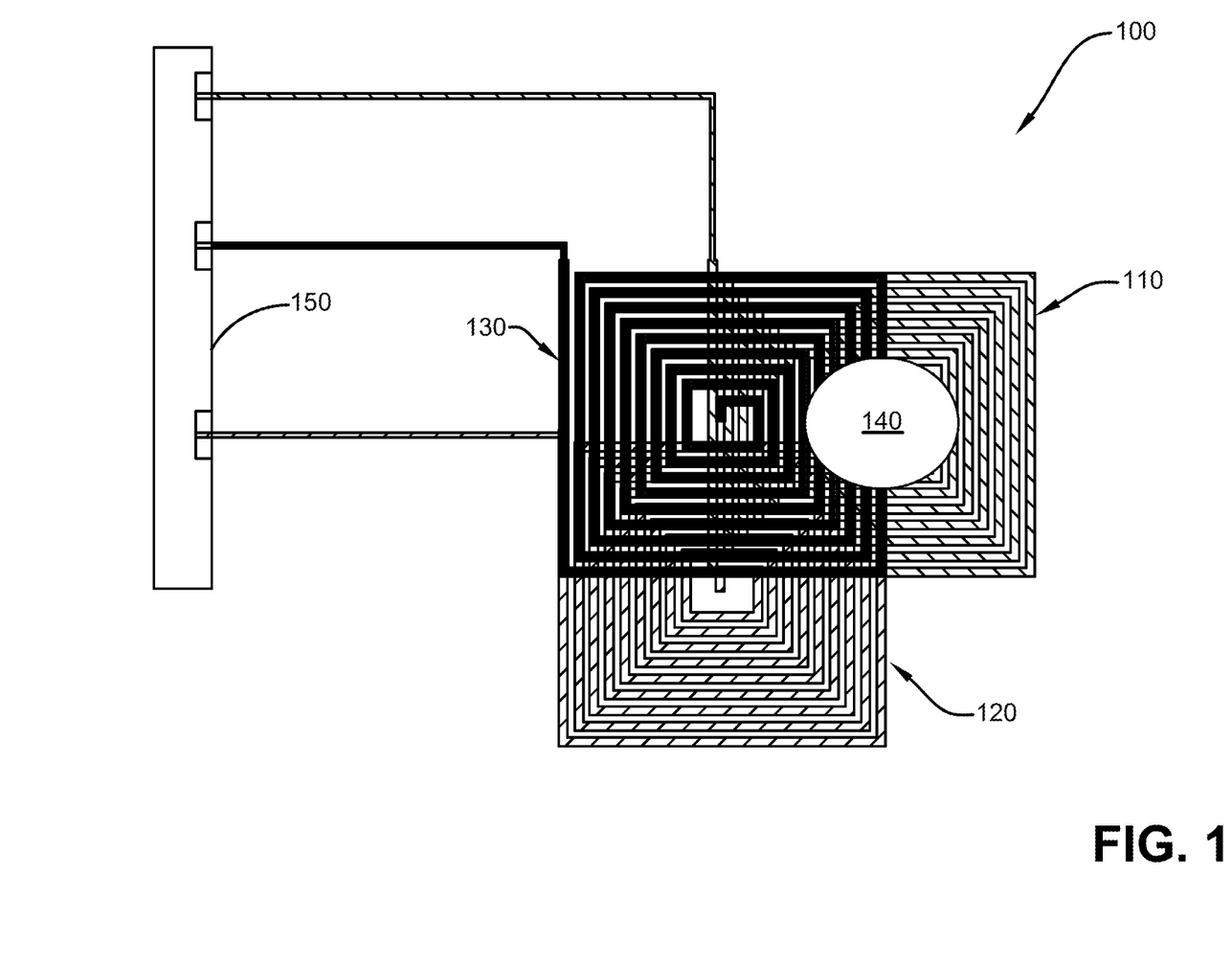
FIG. 1 is a schematic view of a multiplanar electromagnetic array.

In FIG. 1, a schematic view of a multiplanar electromagnetic array 100 is shown. The multiplanar electro magnetic array includes a first-layer electromagnetic coil 110 in a first plane, a second-layer electromagnetic coil 120 in a second plane, and a third-layer electromagnetic coil 130 in a third plane. In some implementations, the electromagnetic coils 110, 120, 130 are planar PCB electromagnetic coils. The second-layer electromagnetic coil 120 partially overlaps the first-layer electromagnetic coil 110 in the diagonal direction. The third-layer electromagnetic coil 130 partially overlaps the second-layer electromagnetic coil 120 in the y-direction and partially overlaps the first-layer magnetic coil 110 in the x-direction. In some embodiments, the multiplanar electromagnetic array 100 includes a plurality of first-, second-, and third-layer electromagnetic coils, with first layer coils being coplanar with one another, second layer coils being coplanar with one another, and third layer coils being coplanar with one another, while the different layers of coils are in different planes. The first-, second-, and third-layer electromagnetic coils may overlap with coils in other layers to any degree, including 5-95% overlap of the surface areas of adjacent-overlapping electromagnetic coils. In addition, while FIG. 1 illustrates three layers, it is to be understood that the array 100 can include more than three layers of electromagnetic coils, with each layer including at least one electromagnetic coil.

The multiplanar electromagnetic array 100 further comprises a permanent magnet 140. In some implementations, the permanent magnet 140 is a neodymium magnet. The multiplanar electromagnetic array 100 also comprises a microactuator 150. The programmable microactuator 150 generates a spatiotemporal magnetic field by sequentially energizing at least two of the first-layer electromagnetic coil 110, the second layer electromagnetic coil 120, or the third-layer electromagnetic coil 130, and wherein the spatiotemporal magnetic field actuates the permanent magnet 140 in X-, Y-, and diagonal directions on a 2D plane. While FIG. 1 depicts a particular arrangement of the coils 110, 120, and 130, other arrangements are contemplated. For instance, center points of the first-layer electromagnetic coil 110 and the second-layer electromagnetic coil may be misaligned in the Y direction and misaligned in the X direction.

Figure 2:
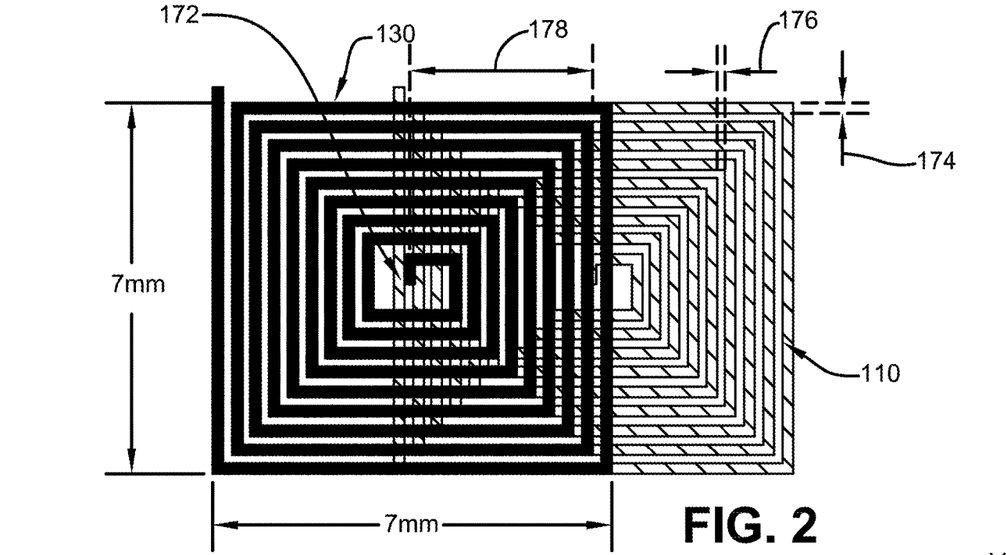
FIG. 2 illustrates an example configuration of two electromagnetic coils within a multiplanar electromagnetic array.

As shown in FIG. 2, each electromagnetic coil 110, 120, 130 has a center point 172. In some embodiments, the electromagnetic coils 110, 120, 130 have a width of about 7 mm and a height of about 7 mm. A center-to-center distance 178 between the center point 172 of the first-layer electromagnetic coil 110 and the center point 172 of the third-layer electromagnetic coil 130 in the X-direction is about 4.5 mm. While not illustrated, a center-to-center distance 178 between the center point 172 of the second-layer electromagnetic coil 120 and the center point 172 of the third-layer electromagnetic coil 130 in the Y-direction is about 4.5 mm. A center-to-center distance 178 between the center point 172 of the first-layer electromagnetic coil 110 and the center point 172 of the second-layer electromagnetic coil 120 in the diagonal-direction is about 6.3 mm. Each of the electromagnetic coils 110, 120, 130 has a width of about 170 um, a thickness, i.e., thickness of the wire making up the electromagnetic coil 110, 120, 130 of about 36 um, and a pitch distance 176, i.e., the distance between each turn of the electromagnetic coil 110, 120, 130, of about 340 um. In exemplary implementations, the power input is about 5V. The electromagnetic coil 110, 120, 130 may be a copper coil. The number of turns within the electromagnetic coil 110, 120, 130 may comprise 3-20 turns. In a specific example, each of the coils 110, 120, 130 includes 8 turns.

Figure 3:
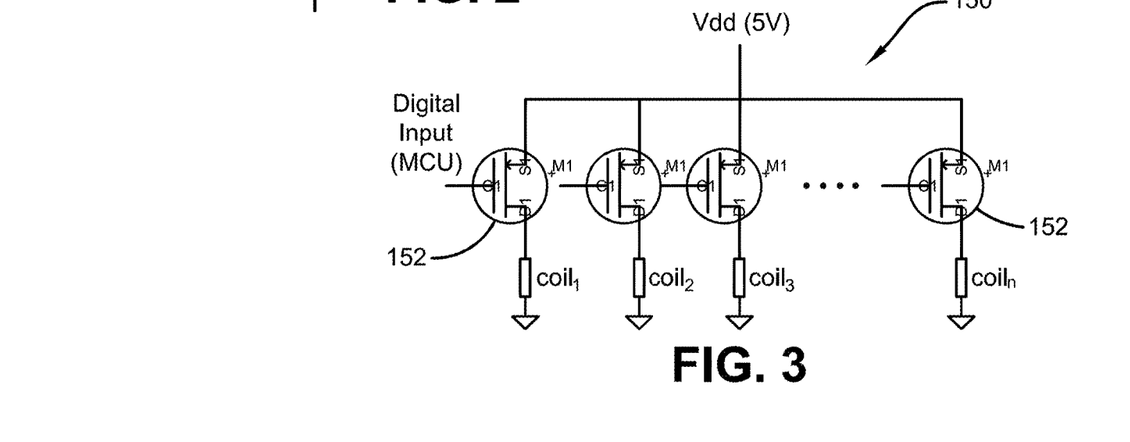
FIG. 3 illustrates an example configuration of a digital input within the multiplanar electromagnetic array.

FIG. 3 illustrates an example configuration of the microactuator 150 within the multiplanar electromagnetic array 100. In example implementations, the microactuator 150 comprises a series of switches 152, each of which is operably connected to one of the electromagnetic coils 110, 120, 130. A digital input (MCU) allows a user to input a sequencing pattern of energizing and de-energizing the electromagnetic coils 110, 120, 130 by actuating the switches 152 of the microactuator 150 in sequence.

Figure 4:
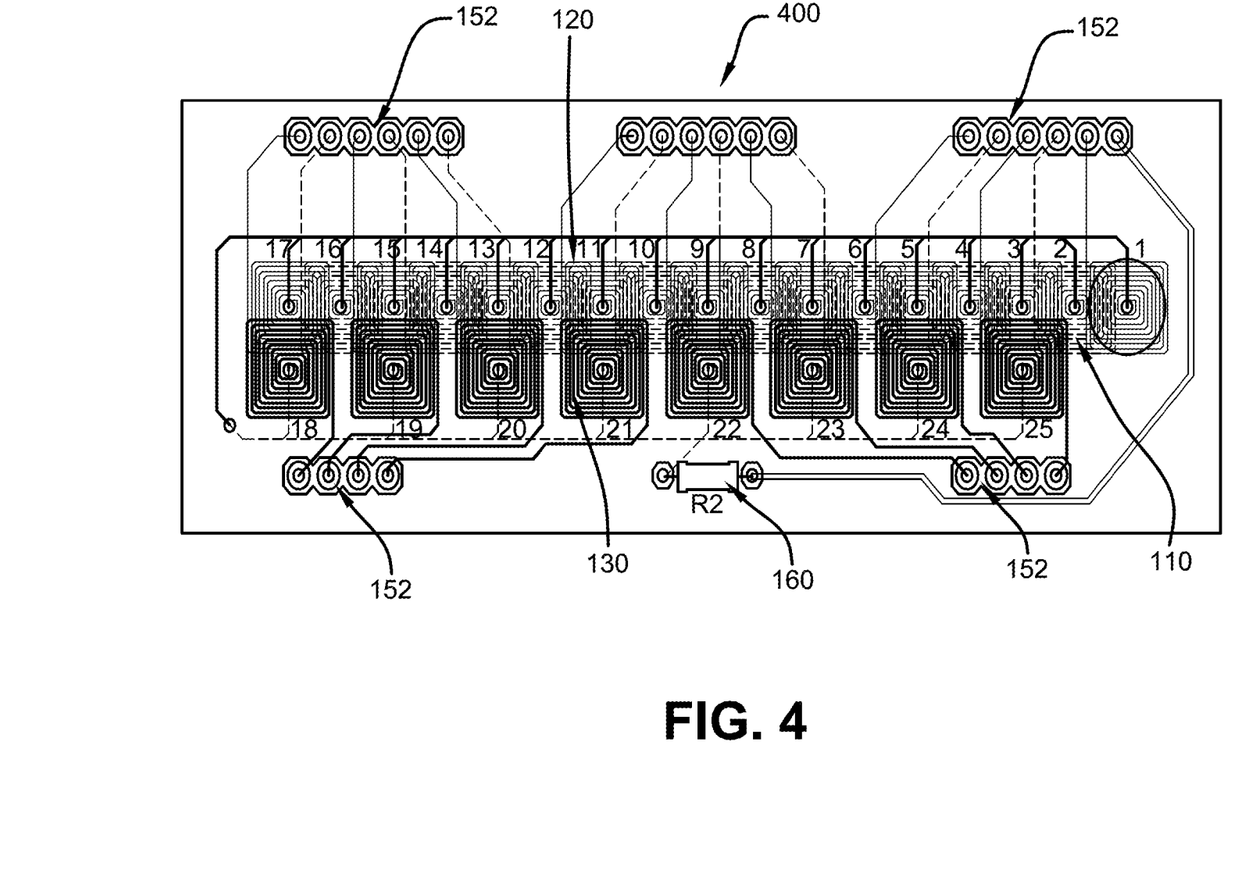
FIG. 4 illustrates an example configuration of a multiplanar electromagnetic array.

FIG. 4 illustrates an example configuration of a multiplanar electromagnetic array 400. In an example configuration thereof, the multiplanar electromagnetic array 400 comprises 3-50 coils. In another example, the array 400 includes 5-30 coils. In a more specific example, the array 400 consists of 25 coils, split between the first-, second-, and third layers of the multiplanar electromagnetic array 400. For instance, the multiplanar electromagnetic array 400 may consist of 8 first-layer electromagnetic coils, 9 second-layer electromagnetic coils, and 8 third-layer electromagnetic coils. In addition to the uses described herein, the multiplanar electromagnetic array 400 may also be utilized as a heater. In addition, the electromagnetic coil layout can be modified to achieve finer magnet movement, which is potentially beneficial for miniaturization of the system or accurate positioning of magnet beads within a sensing window (e.g., optical alignment).

Figure 5:
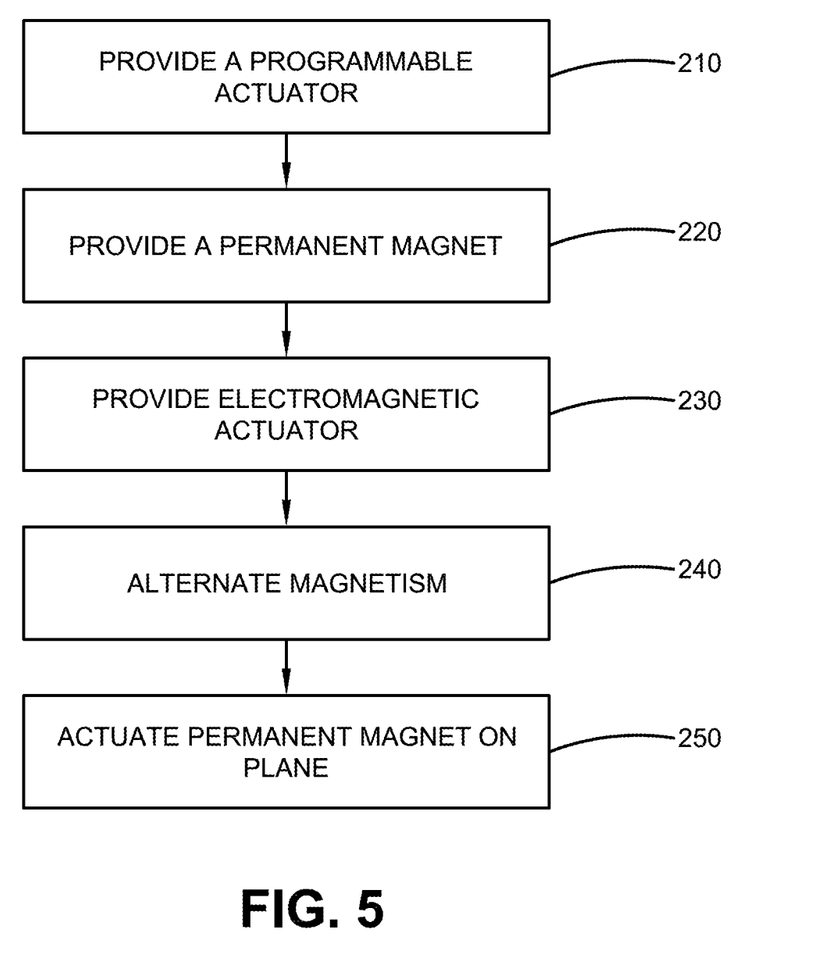
FIG. 5 is a flow diagram illustrating a methodology for actuating a permanent magnet.

FIG. 5 is a diagram showing the steps of an example of a method 500 of transporting the permanent magnet 140 on the electromagnetic microactuator array 400. At 210, a programmable actuator is provided. Providing the programmable actuator includes providing a first-layer electromagnetic coil 110 and a second-layer electromagnetic coil 120, where the second-layer electromagnetic coil 120 is partially overlapping the first-layer electromagnetic coil 110 in the diagonal direction. Providing the programmable actuator further includes providing a third-layer electromagnetic coil 130, where the third-layer electromagnetic coil 130 is partially overlapping the second-layer electromagnetic coil 120 in the y-direction, and where the third-layer electromagnetic coil 130 is partially overlapping the first-layer magnetic coil 110 in the x-direction. At 220, a permanent magnet 140 is provided, and at 230, an electromagnetic microactuator is provided. At 240, the magnetism of the programmable actuator 210 is alternated, and at 250, the permanent magnet is actuated on a plane. Altering the magnetism of the programmable actuator includes generating a spatiotemporal magnetic field by sequentially energizing coils in the array; and actuating the permanent magnet in X-, Y-, and diagonal directions on a plane.

Figure 6:
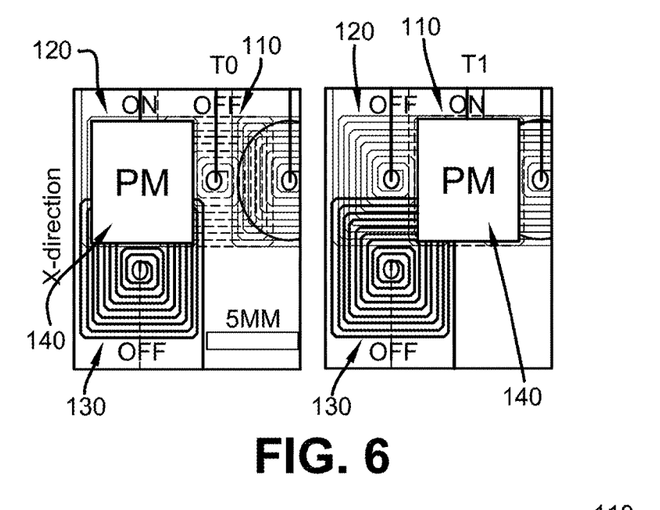
FIG. 6 shows actuation of a permanent magnet in the x-direction using a multiplanar electromagnetic array.

FIG. 6 shows the actuation of the permanent magnet 140 in the x-direction using the multiplanar electromagnetic array 100. The permanent magnet 140 can be moved in the X-direction by first energizing the first-layer electromagnetic coil 110 while refraining from energizing the second electromagnetic coil 120 or the third-layer electromagnetic coil 130. Then, the second-layer electromagnetic coil 120 is energize and the first layer-electromagnetic coil 110 is de-energized. This causes the magnetic field of the second-layer electromagnetic coil to pull the permanent magnet 140 towards its center, overcoming the friction holding the permanent magnet 140 in place, and moving the permanent magnet 140 to the center of the second-layer electromagnetic coil 120 in the x-direction. In some embodiments, there is no temporal overlap between when the first-layer electromagnetic coil 110 is de-energized and when the second-layer electromagnetic coil 120 is energized (e.g., the two electromagnetic coils are not energized at the same time). In other embodiments, there is temporal overlap, such that both the first and second electromagnetic coils 110 and 120 are energized at the same time, and then the first electromagnetic coil 110 is de-energized while the second electromagnetic coil 120 is energized. Still further, voltage used to energize the electromagnetic coils can optionally be ramped up and down in connection with transporting the permanent magnet 140. Thus, when the permanent magnet 140 is to be transported from being positioned above the center of the first electromagnetic coil 110 to being positioned above the center of the second electromagnetic coil 120, voltage used to drive the first electromagnetic coil 110 can be decreased over a predefined time window while voltage used to drive the second electromagnetic coil 120 can be increased over the predefined time window.

Figure 7:
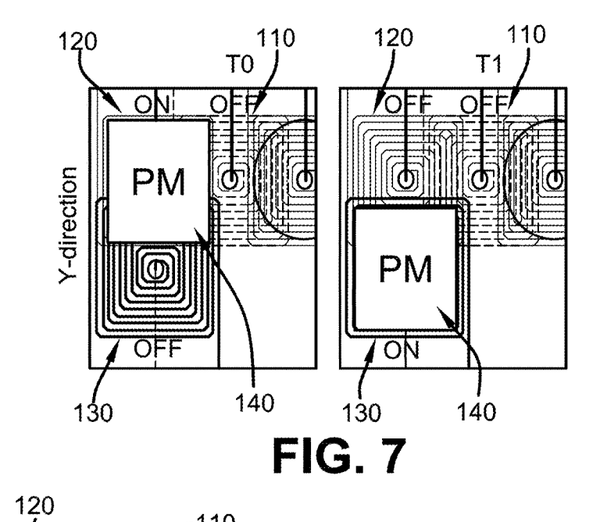
FIG. 7 shows the actuation of a permanent magnet in the y-direction using a multiplanar electromagnetic array.

FIG. 7 shows the actuation of the permanent magnet 140 in the y-direction using the multiplanar electromagnetic array 100. The permanent magnet 140 is positioned over the second-layer electromagnetic coil 120, which can be energized (and thus the permanent magnet 140 is attracted via a magnetic field to the center of the second-layer electromagnetic coil 120). The first-layer electromagnetic coil 110 and the third-layer electromagnetic coil 130 are not energized. Thereafter, the third-layer electromagnetic coil 130 is energized and the second-layer magnetic field 120 is de-energized, resulting in the magnetic field of the third electromagnetic coil 130 pulling the permanent magnet 140 towards its center, overcoming the friction holding the permanent magnet 140 in place, and moving the permanent magnet 140.

Figure 8:
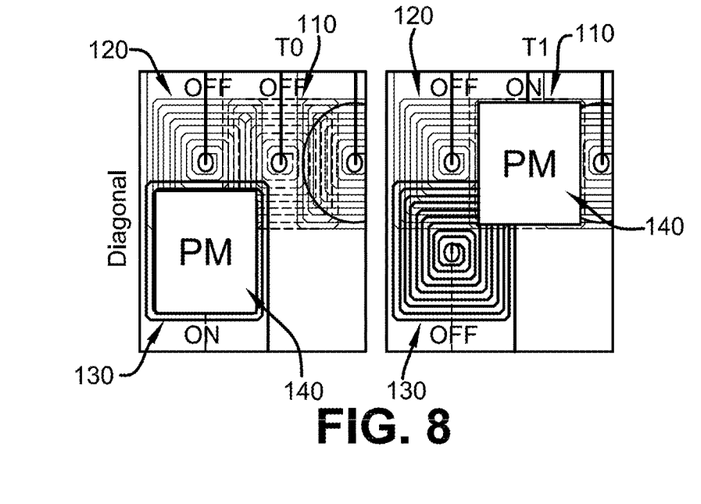
FIG. 8 shows the actuation of a permanent magnet in the diagonal-direction using a multiplanar electromagnetic array.

FIG. 8 shows the actuation of the permanent magnet 140 in the diagonal-direction using the multiplanar electromagnetic array 100. The permanent magnet 140 can be manipulated in the diagonal-direction by first energizing the third-layer electromagnetic coil 130 while the first-layer electromagnetic coil 110 and the second-layer electromagnetic coil 120 are not energized. Then, the first-layer electromagnetic coil 110 is energized and the third-layer electromagnetic coil 130 is de-energized, such that the magnetic field of the third electromagnetic coil 130 pulls the permanent magnet 140 towards the center of the third electromagnetic coil 130, overcoming the friction holding the permanent magnet 140 in place. As indicated previously, two coils may be simultaneously energized; alternatively, one coil is energized at a time. Further, as noted previously, voltages used to energize the coils can be ramped up and down to facilitate transport of the permanent magnet over the array 100.

Figure 9:
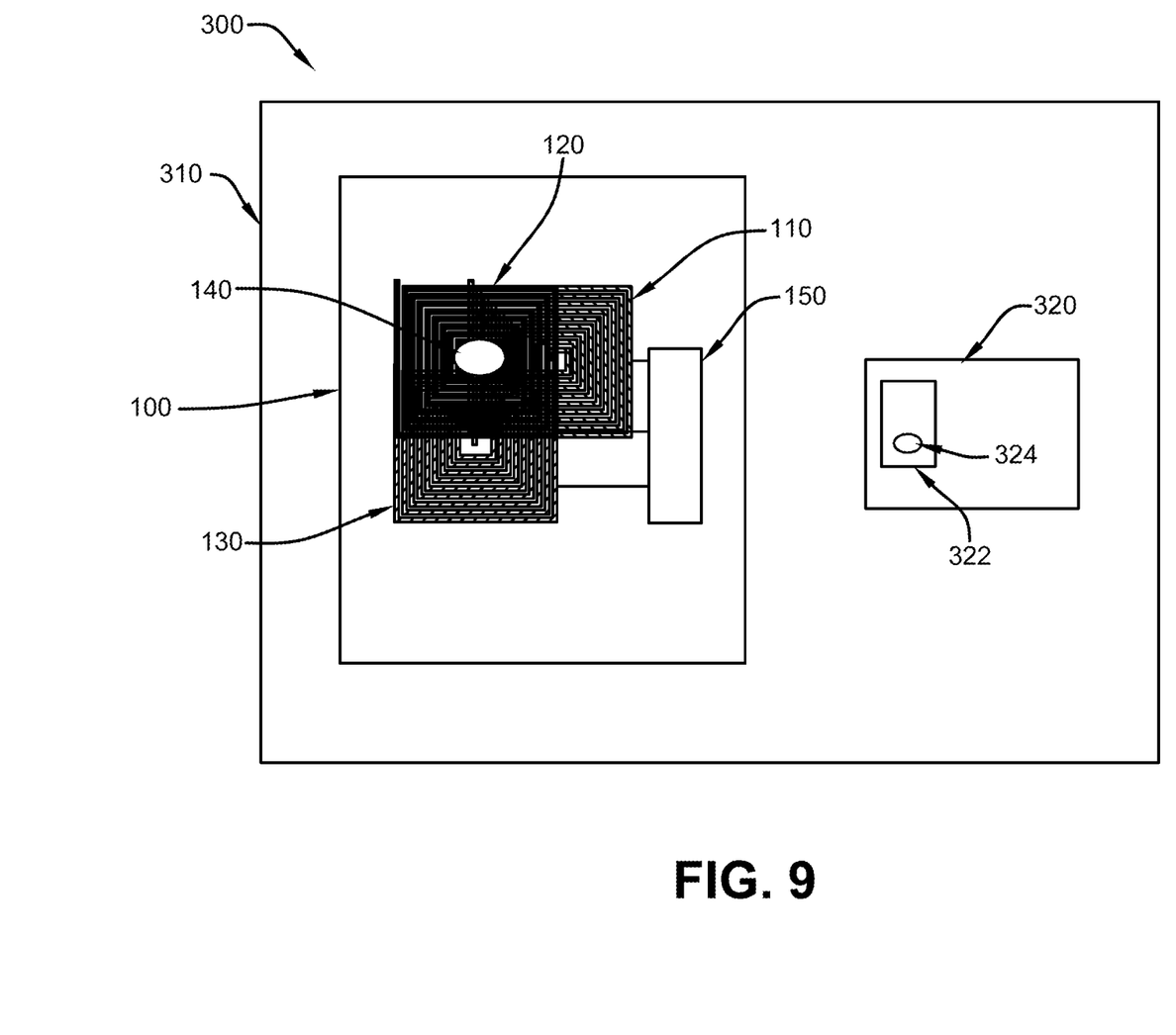
FIG. 9 is a schematic view of a microfluidic immunoassay device.

FIG. 9 is a schematic view of a microfluidic immunoassay device 300. The microfluidic immunoassay device 300 comprises a mobile analyzer 310 and a microfluidic chip 320. The mobile analyzer 310 includes the multiplanar electromagnetic array 100 as described herein. The microfluidic immunoassay device 300 further comprises the programmable microactuator 150. In exemplary embodiments, the microfluidic chip 320 includes a channel 322 and a magnetic bead 324 housed therein. The programmable microactuator 150 generates a spatiotemporal magnetic field by sequentially energizing coils in different layers of the array 100, such that the magnet is movable in any suitable direction across a surface of the array 100. The permanent magnet 140 is capable of manipulating the magnetic bead 324 within the channel 322 of the microfluidic chip 320. For example, the microfluidic chip 320 is positioned above the array 100, and movement of the permanent magnet 140 results in corresponding movement of the bead 324.

Figure 10:
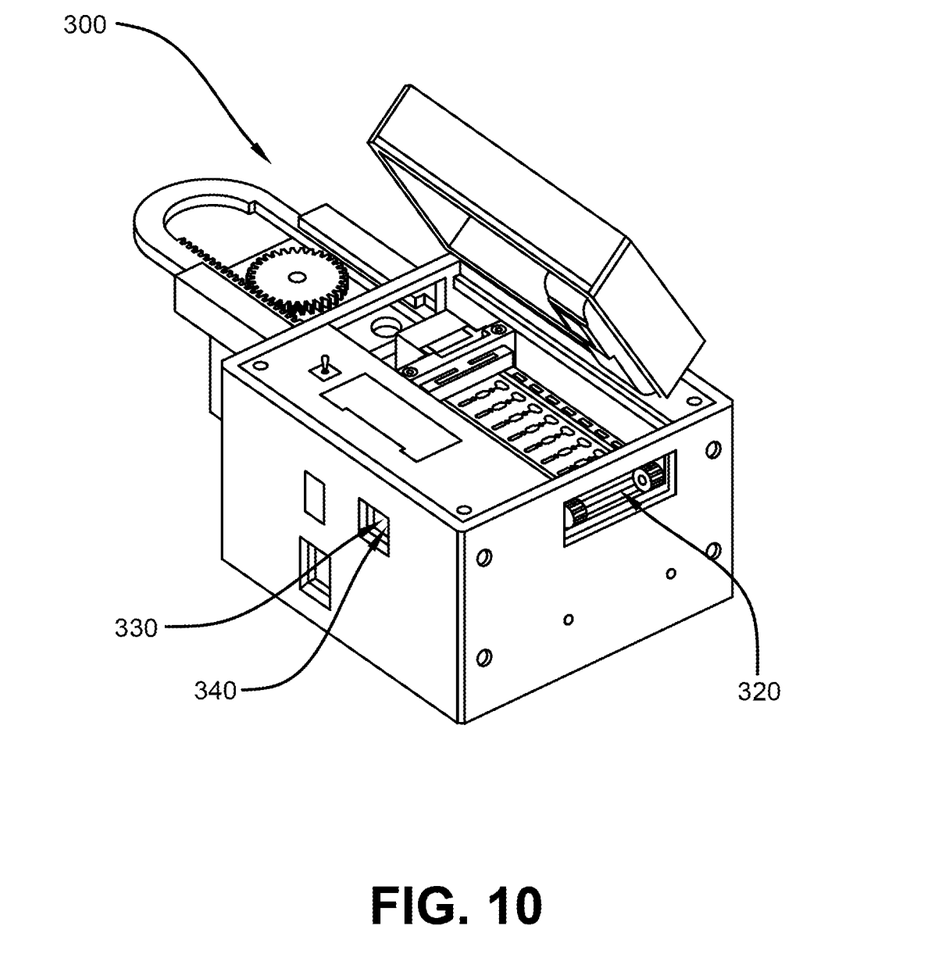
FIG. 10 shows an example microfluidic immunoassay device.

FIG. 10 shows an example microfluidic immunoassay device. Example immunoassay devices may include protein detection assays and immune assays, small molecule detection assays, for toxin detections using antibodies and toxic detection using other biological interactions, such as ligand receptor binding assays, and nucleic acids. The multiplanar electromagnetic array actuates the permanent magnet to move a magnetic bead into a desired working chamber through channel.

For automated microfluidic sample preparation, magnetic beads can be actuated against stationary reagent droplets in a fluidic channel/chamber by controlled neodymium magnet motion on electromagnet micro-actuators. The integrated sample preparation includes incubation, purification, and chemiluminescent (CL) reaction steps. During the incubation step, a functionalized bead specifically captures the complex of the target protein and HRP-conjugated detection antibody into the sample chamber. After the incubation, the neodymium magnet drags the target-captured magnetic beads to the purification chamber. For purification, magnetic beads can be agitated back and forth to remove the reagent carryovers (i.e., unbound analyte and detector antibodies) from the sample chambers. Thoroughly washed beads can be transferred to the reaction chamber for CL measurement.

Figure 11:
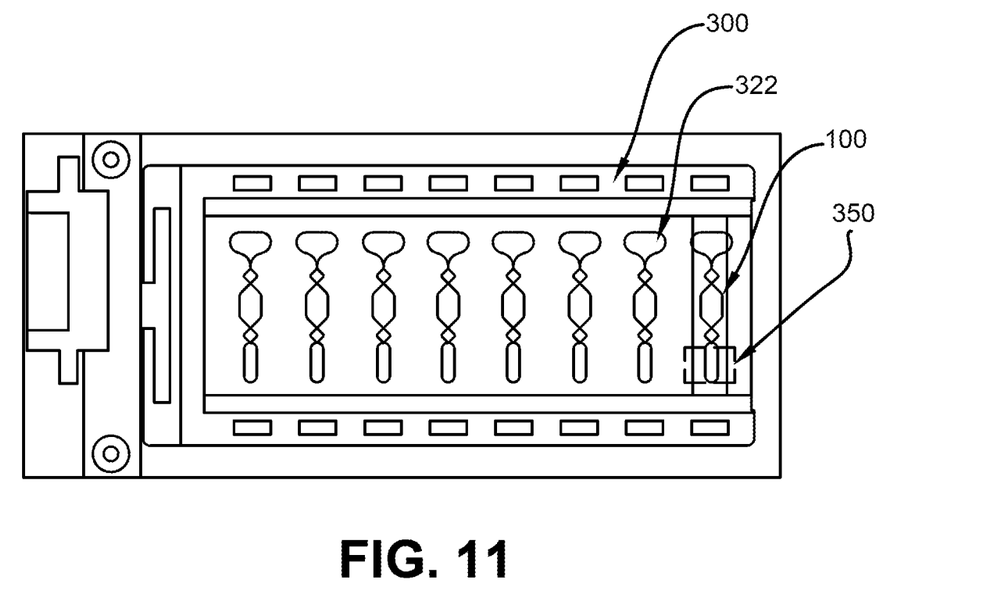
FIG. 11 shows an example microfluidic chip comprising eight channels and an example multiplanar electromagnetic array positioned underneath the microfluidic chip within a microfluidic immunoassay device.

A funnel-shaped microfluidic channel between chambers and valve assists in forming the magnetic bead cluster and enhances the magnetic force acting on the beads for efficient bead capture. It can be noted that the mass of the magnetic bead cluster is proportional to the magnetic force. The addition of 1% ABIL EM-90 surfactant in mineral oil lowers the interfacial tension at the aqueous-to-oil interface; thus, magnetic beads can easily transport from chamber to chamber without significant loss FIG. 11 shows an example microfluidic chip comprising eight channels and an example multiplanar electromagnetic array positioned underneath the microfluidic chip within a microfluidic immunoassay device.

Figure 12:
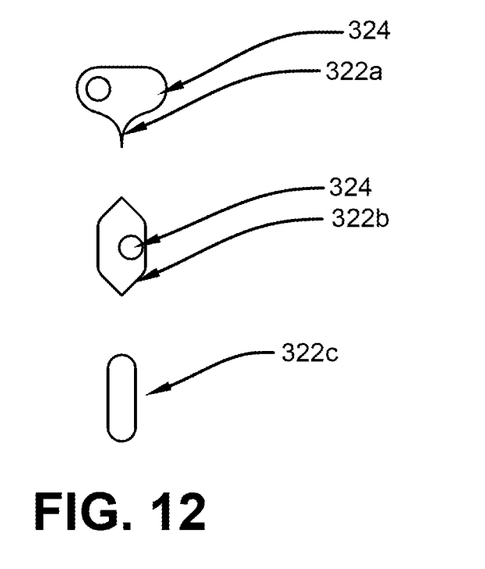
FIG. 12 shows an example channel of a microfluidic chip comprising three chambers, two of which comprise a magnetic bead.

FIG. 12 shows an example channel 322 of the microfluidic chip 320, where the channel 320 includes three chambers 322a, 322b, 322c, two of which comprise a magnetic bead 324. Once a prepared microfluidic chip is inserted, the platform facilitates the automated sample process (i.e., incubation and purification). During the incubation, the microfluidic chip tumbles to prevent the bead settlement and promote the formation of capture antibody-coupled magnetic beads, antigen, and HRP-linked antibody complex for CL detection. After the sample preparation, the CL signal from each testing unit is measured one at a time; then analyzed using any suitable technology.

EXAMPLES

As noted above, FIG. 10 shows an integrated system that includes the array 100. The integrated system depicted in FIG. 10 has a footprint of 11×12×8 cm and includes optical and electromechanical subsystems. The optical subsystem includes a low-noise CMOS imager (ULS24, Anitoa Systems) that was integrated into the system to measure a chemiluminescent signal. The image sensor surface is directly in contact with the microfluidic channel to enhance the collection of blue emission light (peak wavelength: 425 nm). In this optical configuration, the sensing area (3.6×3.6 mm) sufficiently covers the detection zone of the individual testing unit without an optical lens or filter. A mylar reflective film was attached on top of the permanent magnet located at the bottom of the detection zone during the chemiluminescent measurement to further increase the light collection. The electromechanical subsystems include linear, rotary, and electromagnetic actuators. For a linear actuator, a rack-and-pinion mechanism converts the rotary motion of the stepper motor into a linear motion using rack/pinion gears. A unipolar stepper motor enables the positioning of the microfluidic chip. On the right edge of the rack, a high-torque servomotor was installed as a rotary joint to rotate the microfluidic chip. A custom-printed planar electromagnetic microactuator array was used to actuate a neodymium magnet (grade: N52) that further manipulates the magnetic beads in a microfluidic channel in a programmed manner. Each rectangular-shaped planar coil has a copper trace with a width of 170 μm, a thickness of 36 μm, and a pitch of 170 μm. Adjacent planar coils are partially overlapped in different printed circuit board (PCB) layers with a 4.5 mm gap. It is noteworthy that magnetic force follows an inverse square relationship with distance. Therefore, a neodymium magnet close to the coil center can be actuated by a small electromagnetic field with low power consumption (<2.5 W). To transport a neodymium magnet from one location to another, the localized electromagnetic field is generated from the coil one at a time by sequentially switching the transistor. A PCB with an embedded microcontroller unit (MCU) operated all integrated electronic components. The entire system was powered by either a USB connection or a DC power adapter (5 V, 500 mA).

The embedded programmable planar electromagnetic microactuator array actuates the permanent magnet. Thus, magnetic beads can be manipulated against stationary droplets by strong magnetic interaction, enabling an autonomous sample process. The system facilitates the whole immunoassay process (i.e., incubation, purification, and chemiluminescent reaction) from raw samples in 45 minutes total processing time for 8 samples. The device achieved a detection limit of 10 pg/ml with Interleukin-6 (IL-6) in human serum. The sensitive, quantitative, and high-throughput immunoassay device enables timely and accurate diagnosis at the clinical site.

Further, the system shown in FIG. 10 includes a mobile analyzer and a compact microfluidic chip. As noted above, the platform integrates electromechanical and optical subsystems, and the microfluidic chip contains eight spatially isolated testing units spaced for 8-channel pipette compatibility. The chip can be a reagent-compact microfluidic chip. As indicated above, within 45 minutes, the system can automatically prepare eight samples for CL measurement from human serum. The unit-to-unit consistency indicated eight testing units' robust sample process with minimal bead loss and optical uniformity. Besides, the linear standard curve showed the quantitative ability of the platform. The device achieved a detection limit of 10 pg/ml with IL-6 spiked in human serum. Finally, it was confirmed that integrated sample purification reduced the non-specific signal originating from the sample matrix effect, thus, improving the detection sensitivity.

The microfluidic chip was constructed by casting polydimethylsiloxane (PDMS) into a 3D-printed reusable master mold. A negative mold was printed with a commercial resin-based stereolithography 3D printer (Form 3, Formlabs). After printing, the mold was sonicated with isopropyl alcohol, then post-cured in a UV box at 60° C. for 30 minutes. The mold surface was silane-modified following oxygen plasma treatment to avoid PDMS sticking to the mold surface and prevent uncured resin residues from interfering with PDMS curing. To fabricate the PDMS device, curing and elastomer agents were thoroughly mixed in 1:10 (m/m), degassed in a vacuum desiccator, then cured at 65°

C. for 2 hours. Reagent-loading holes were punched on a PDMS stamp and irreversibly bonded to a glass slide following oxygen plasma treatment.

The compact reagent microfluidic chip (25×70 mm) has eight spatially isolated testing units spaced for standard 8-channel pipette compatibility. Each testing unit has a sample, purification, and reaction chambers. These three chambers contain 15 μl of sample diluent with 25 μg of functionalized magnetic beads, 15 μl of washing buffer (PBS with 0.5% TWEEN-20), and 8 μl of chemiluminescent substrate, respectively. In addition, two oil valves hold 10 μl of mineral oil with 1% ABIL to separate the chambers. All reagents required for magnetic bead-based sandwich immunoassay were pre-loaded into the chip before the test.

An integrated magnetic bead-based sandwich immunoassay has three components: capture bead, detector antibody, and target protein samples. Capture bead preparation: 30 μg of target-specific polyclonal antibody was covalently coupled to 1 mg of epoxy-activated superparamagnetic bead surface using a commercially available antibody-coupling kit (14311D, Invitrogen). After overnight incubation at room temperature, antibody-coupled beads were thoroughly washed three times with purification buffer to remove the unbound antibody excess and then blocked with SuperBlock agent (37518, Thermo Scientific) to prevent non-specific binding. The final stock concentration of the capture bead was set to 10 mg/ml. HRP-labeled detector preparation: monoclonal antibody was labeled with HRP conjugation kit (ab102890, Abcam). The final concentration of the HRP-labeled detector was adjusted to 1 μg/ml with phosphate buffer saline (PBS) with 0.05% tween-20. Target protein sample preparation: protein was spiked into PBS and human serum to validate the assay and sample matrix effect.

Since the microfluidic immunoassay device facilitates eight tests, unit-to-unit consistency is a prerequisite for quantitative comparison. An IL-6 detection assay was used as a model to assess uniformity between channels. An identical concentration of purified IL-6 aliquot was loaded into each testing unit, and then processed using the automated protocol. The quantitative results among eight testing units showed excellent uniformity with slight variation, implying good optical alignment (i.e., CMOS sensor, final position of beads in reaction chamber). The unit-to-unit consistency indicates robust reagent mixing and washing during the sample preparation, and consistent transfer of magnetic beads throughout the process. While manual sandwich immunoassays on microplates (e.g., ELISA) is prone to human errors due to iterative liquid exchanging steps, the integrated autonomous sample process mitigates such errors and allows eight tests on the mobile immunoassay platform.

The analytical sensitivity of the immunoassay device 300 was validated and optimized using an IL-6 detection assay. A 10-fold serial dilution of IL-6 (10-3-103 ng/ml) was spiked in human serum to mimic complex protein samples. The immunoassay device 300 automatically carried out the sandwich immunoassay on the microfluidic chip 320. The detection limit was determined as the lowest analyte concentration with a 3×standard deviation higher than the signal background. The detection limit of 10 μg/ml was achieved with the presence of sample matrix. This level of sensitivity is comparable to a benchtop plate reader.

It was further investigated how an integrated sample purification process enhances the device performance against the sample matrix effect. Without the on-chip sample purification, an order of magnitude higher detection limit (i.e., ~480 μg/ml) and decreased signal-to-background ratios were observed for pure PBS and complex serum spiked samples, indicating the clear presence of the sample matrix effect. More specifically, the small amount of unbound HRP-labeled antibodies was carried over to the reaction chamber with beads due to viscous human serum. The incorporated washing step mitigates such sample matrix hindrance and enables sensitive protein detection.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multiplanar electromagnetic array comprising:
   a first-layer electromagnetic coil located in a first plane;
   a second-layer electromagnetic coil located in a second plane, and further wherein the second-layer electromagnetic coil is partially overlapping the first-layer electromagnetic coil and is offset from the first-layer electromagnetic coil in X and Y directions;
   a third-layer electromagnetic coil located in a third plane, wherein the third-layer electromagnetic coil is partially overlapping the second-layer electromagnetic coil and is offset from the second-layer electromagnetic coil in the Y-direction, wherein the third-layer electromagnetic coil and the second-layer electromagnetic coil are aligned in the X-direction, wherein the third-layer electromagnetic coil is partially overlapping the first-layer electromagnetic coil and is offset from the first-layer electromagnetic coil in the X-direction, and further wherein the third-layer electromagnetic coil and the first-layer electromagnetic coil are aligned in the Y-direction; and
   a programable microactuator that is electrically coupled to the first-layer electromagnetic coil, the second-layer electromagnetic coil, and the third-layer electromagnetic coil, wherein the programable microactuator generates a spatiotemporal magnetic field by sequentially energizing at least two of the first-layer electromagnetic coil, the second-layer electromagnetic coil, or the third-layer electromagnetic coil, and wherein the programmable microactuator is configured to control movement of a permanent magnet within a fourth plane based on the generated spatiotemporal magnetic field.

2. The multiplanar electromagnetic array of claim 1, wherein the first-layer electromagnetic coil, the second-layer electromagnetic coil, and the third-layer electromagnetic coil are planar printed circuit board (PCB) electromagnetic coils.

3. The multiplanar electromagnetic array of claim 1, wherein the permanent magnet comprises neodymium.

4. The multiplanar electromagnetic array of claim 1, further comprising a plurality of first-layer electromagnetic coils in the first plane, a plurality of second-layer electromagnetic coils in the second plane, and a plurality of a third-layer electromagnetic coils in the third plane, wherein each of the second-layer electromagnetic coils partially overlaps at least one of the first-layer electromagnetic coils, and each of the third-layer electromagnetic coils partially overlaps at least one of the second-layer electromagnetic coils.

5. The multiplanar electromagnetic array of claim 1, wherein the first-layer electromagnetic coil, the second-layer electromagnetic coil, and the third-layer electromagnetic coil have a width of about 7 mm and a height of about 7 mm.

6. The multiplanar electromagnetic array of claim 1, wherein the first-layer electromagnetic coil has a first center point, the second-layer electromagnetic coil has a second center point, and the third-layer electromagnetic coil has a third center point, wherein a first distance between the first center point and the second center point is about 4.5 mm, wherein a second distance between the second center point and the third center point is about 4.5 mm, and further wherein a third distance between the first center point and the third center point is about 6.3 mm.

7. The multiplanar electromagnetic array of claim 1, wherein the first-layer electromagnetic coil, the second-layer electromagnetic coil, and the third-layer electromagnetic coil have a copper trace with a width of about 170 um, a thickness of about 36 um, and a pitch distance of about 340 um.

8. The multiplanar electromagnetic array of claim 1 comprising between 5 and 30 electromagnetic coils.

9. The multiplanar electromagnetic array of claim 1, comprising 25 electromagnetic coils.

10. The multiplanar electromagnetic array of claim 1, wherein 5 V is employed to energize coils of the array.

11. A method of manufacturing an electromagnetic microactuator array, the method comprising:
providing a first electromagnetic coil, a second electromagnetic coil, and a third electromagnetic coil;
positioning the first electromagnetic coil in a first plane;
positioning the second electromagnetic coil in a second plane, wherein the second electromagnetic coil is partially overlapping the first electromagnetic coil and is offset from the first electromagnetic coil in X and Y directions;
positioning the third electromagnetic coil in a third plane, wherein the third electromagnetic coil is partially overlapping the second electromagnetic coil and is offset from the second electromagnetic coil in the Y-direction, wherein the third electromagnetic coil and the second electromagnetic coil are aligned in the X-direction, wherein the third electromagnetic coil is partially overlapping the first electromagnetic coil and is offset from the first electromagnetic coil in the X-direction, and further wherein the third electromagnetic coil and the first electromagnetic coil are aligned in the Y-direction; and
electrically coupling a programable microactuator to the first electromagnetic coil, the second electromagnetic coil, and the third electromagnetic coil, wherein the programmable microactuator is configured to generate a spatiotemporal magnetic field by sequentially energizing at least two of the first electromagnetic coil, the second electromagnetic coil, or the third electromagnetic coil, and wherein the programmable microactuator is configured to control movement of a permanent magnet within a fourth plane based on the generated spatiotemporal magnetic field.

12. The method of claim 11, wherein the first plane, the second plane, and the third plane are parallel with one another.

13. The method of claim 11, further comprising:
positioning a first plurality of electromagnetic coils in the first plane;
positioning a second plurality of electromagnetic coils in the second plane; and
positioning a third plurality of electromagnetic coils in the third plane, where each electromagnetic coil in the first plane partially overlaps with an electromagnetic coil in the second plane, each electromagnetic coil in the second plane partially overlaps with an electromagnetic coil in the third plane, and each electromagnetic coil in the third plane partially overlaps with an electromagnetic coil in the first plane.

14. The method of claim 13, wherein the first plurality of electromagnetic coils consists of eight electromagnetic coils, the second plurality of electromagnetic coils consists of nine electromagnetic coils, and the third plurality of electromagnetic coils consists of eight electromagnetic coils.

15. The method of claim 11, wherein the first electromagnetic coils, the second electromagnetic coil, and the third electromagnetic coil are planar printed circuit board (PCB) electromagnetic coils.

16. The method of claim 11, further comprising positioning the permanent magnet above a center of the first electromagnetic coil.

17. The method of claim 11, wherein the first electromagnetic coil has a first center point, the second electromagnetic coil has a second center point, and the third electronic coil has a third center point, and further wherein a distance between the first center point and the second center point is about 4.5 mm, a distance between the second center point and the third center point is about 4.5 mm, and a distance between the first center point and the third center point is about 6.3 mm.

18. The method of claim 17, wherein the first electromagnetic coil, the second electromagnetic coil, and the third electromagnetic coil have a copper trace with a width of about 170 um, a thickness of about 36 um, and a pitch distance of about 340 um.

19. The multiplanar electromagnetic array of claim 1, wherein the first-layer electromagnetic coil, the second-layer electromagnetic coil, and the third-layer electromagnetic coil are rectangular-shaped planar coils.

20. The multiplanar electromagnetic array of claim 1, wherein the programmable microactuator is further configured to:
decrease a first voltage used to drive a first one of the first-layer electromagnetic coil, the second-layer electromagnetic coil, or the third-layer electromagnetic coil over a time window; and
increase a second voltage used to drive a second one of the first-layer electromagnetic coil, the second-layer electromagnetic coil, or the third-layer electromagnetic coil over the time window;
wherein the decreasing of the first voltage and the increasing of the second voltage cause the permanent magnet to be transported from being positioned above a first center of the first one of the first-layer electromagnetic coil, the second-layer electromagnetic coil, or the third-layer electromagnetic coil to being positioned above a second center of second one of the first-layer electromagnetic coil, the second-layer electromagnetic coil, or the third-layer electromagnetic coil.

* * * * *